United States Patent
Nason et al.

(10) Patent No.: US 7,836,500 B2
(45) Date of Patent: Nov. 16, 2010

(54) COMPUTER VIRUS AND MALWARE CLEANER

(75) Inventors: D. David Nason, Bainbridge Island, WA (US); Joshua Nathaniel Lizon, Bremerton, WA (US)

(73) Assignee: eAcceleration Corporation, Poulsbo, WA (US)

(*) Notice: Subject to any disclaimer, the term of this patent is extended or adjusted under 35 U.S.C. 154(b) by 1279 days.

(21) Appl. No.: 11/303,397

(22) Filed: Dec. 16, 2005

(65) Prior Publication Data

US 2007/0143843 A1 Jun. 21, 2007

(51) Int. Cl.
*G06F 21/00* (2006.01)
(52) U.S. Cl. .................................. 726/22; 713/188
(58) Field of Classification Search ............. 726/22–26; 713/188
See application file for complete search history.

(56) References Cited

U.S. PATENT DOCUMENTS

| | | | |
|---|---|---|---|
| 6,542,943 B2 | 4/2003 | Cheng et al. | |
| 6,748,534 B1 | 6/2004 | Gryaznov et al. | |
| 6,886,099 B1 | 4/2005 | Smithson et al. | |
| 6,928,555 B1 | 8/2005 | Drew | |
| 6,952,776 B1 | 10/2005 | Chess | |
| 6,963,978 B1 | 11/2005 | Muttik et al. | |
| 6,973,578 B1 | 12/2005 | McIchionc | |
| 6,980,992 B1 | 12/2005 | Hursey et al. | |
| 6,993,660 B1 | 1/2006 | Libenzi et al. | |
| 7,020,895 B2 | 3/2006 | Albrecht | |
| 7,716,736 B2 * | 5/2010 | Radatti et al. | 726/22 |

* cited by examiner

*Primary Examiner*—Gilberto Barron, Jr.
*Assistant Examiner*—Simon Kanaan
(74) *Attorney, Agent, or Firm*—Steven P. Koda, Esq.

(57) ABSTRACT

A virus and malware cleaner is generated for a personal computer. Scanning software determines the presence of suspicious attributes resident to the computer. When automated detection of the need for a Custom Cleaner occurs, specific system information, along with information about the suspicious attributes, is included in a Custom Cleaner Request. The request is automatically generated and transmitted to a server for processing. In response a Custom Cleaner may be automatically created from a database of parameterized instructions, then downloaded to the user's computer for execution. Automatic verification of the Custom Cleaner success in removing infected files may be sent to the server. In the event that a Custom Cleaner cannot be generated automatically, an escalation occurs in which a support technician becomes involved in preparing the Custom Cleaner. Escalation data accessed by the support technician may include automatically generated diagnostic hints.

27 Claims, 17 Drawing Sheets

Figure 5    Client Side: Virus Found Flowchart

Figure 6   Flowchart Determining and Initiating Custom Cleaner

Figure 9  System Snapshot Process (Log Changes Only)

High-level Server Process Flowchart

Decrypt and Decompression of the Request File

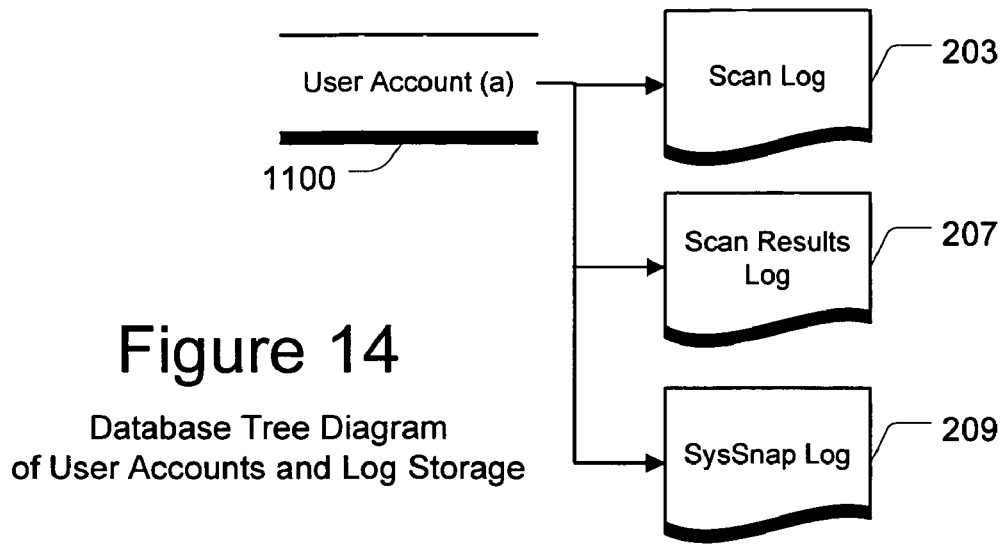
Figure 14
Database Tree Diagram
of User Accounts and Log Storage
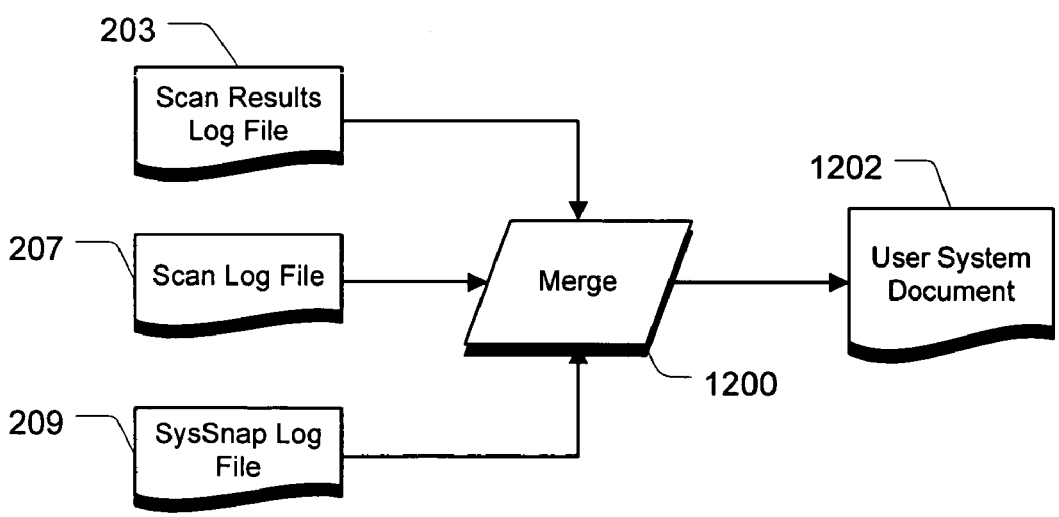
Figure 15  Log Merge Support Technician Flow Chart

COMPUTER VIRUS AND MALWARE CLEANER

FIELD OF THE INVENTION

This invention relates generally to the field of personal computer (PC) software security and integrity, and more particularly to the field of virus and malware scanning, detection and removal.

BACKGROUND OF THE INVENTION

With the prevalence of data communications over the global information network (i.e., the internet), software having a malicious effect on the personal computer may become situated in the computer system using system resources and 'infecting' system 'objects.' The software may be knowingly downloaded, such as where the undesired malicious effect isn't known or appreciated at the time of downloading. Also, the software may tag along with other software. Still further, the software may enter the computer system unknown to the computer user. Typically, the software has effects on the computer that are unknown to the user or undesired by the user. For example, a string of code may embed itself into a strategic location within other code. Upon execution the infiltrating code may replicate itself or generate other code that accesses system resources. Various objects may become 'infected' on a user's machine, including but not limited to: files, directories, registry entries, Layered Service Providers (LSP's), file contents, services, running processes and modules, browser helper objects, and browser cookies.

The term malicious software, or 'malware,' is used to describe software having the malicious effect. In some instances, the software may be referred to as an 'infection,' or a 'computer virus.' In other instances, the software may be referred to as 'spyware' or 'adware.' The term 'malware' is used to encompass computer viruses and other 'infections', along with spyware, adware and other software having a malicious effect on the computer.

An objective of a virus scanning software application is to detect and clean from the computer, various types of virus infections, spyware, adware and applications which are deemed as malware. A conventional virus scanning application includes a scanning engine which has an objective of scanning a user's computer resources to detect whether any known, specific malware items are present, (e.g., to detect infected objects on a user's machine). A conventional virus scanning application includes a set of definition files used by the scanning engine for indicating what objects should be looked for and what actions are to be taken in the case where the object is detected. For example, actions may include shutting down or deleting an infected object.

Accordingly, the performance of a conventional virus scanning software application is limited by the information contained in the definition files. In the event that a virus is not fully removed or that infected files remain after a scan, the user's options are limited. For example, a user may contract for technical support. The user may ship their computer to the contractor to fix the problem. This causes the user to forego access to the computer for days, or weeks at a time. Alternatively, technical support may analyze the problem over the phone by guiding the user through steps. Telephone support, while valuable to users, can be cumbersome and, because of its dependency on considerable user interaction, has a high error probability. One shortcoming of this approach is the amount of time required for communication back and forth between the user and Support Technician. Also, the user of an infected computer may not understand how to navigate their computer and its file system to determine a virus or malware location or type. Further, the user might not gather all the necessary system information needed by Support Technician to properly diagnose a problem. Still further, the instructions to remedy the problem may be too complicated or cumbersome, proving a burden to a novice user.

Accordingly, there is a need for more effective and efficient tools for detecting and clearing viruses and other malware from a user's computer.

SUMMARY OF THE INVENTION

The present invention provides a process and system for generating a potential solution for clearing a user computer of a malicious effect. A request to clean the user computer of the malicious effect is uploaded. Uploading of the request is triggered and performed automatically without user intervention by a user of the user computer. The request includes user computer information. A potential solution to the malicious effect is downloaded, wherein the potential solution is based at least in part upon an automated analysis of the uploaded information. The potential solution is implemented at the user computer.

As used herein a user computer undergoes a malicious effect by the mere presence of a computer virus, undesired spyware, undesired adware or other malware, whether or nor active, and whether or not computer system resources or objects have been damaged. As used herein a user computer also undergoes a malicious effect when system resources or objects become corrupted, damaged, undesirably burdened or otherwise changed in an undesirable manner. The term malware as used herein includes computer viruses, spyware, adware and other data, instructions, code or other software, firmware or digital object deemed as undesirable. It is noted that what is undesirable to one user may be desirable to another, and may even be a viable product of a vendor.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 14 is a diagram of a data base tree in which the uploaded information is associated with a user account;

FIG. 15 is a flow chart of an embodiment of a process for combining the uploaded information into a storage document;

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, enterprise applications, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

Host Network Environment

Figure 1:
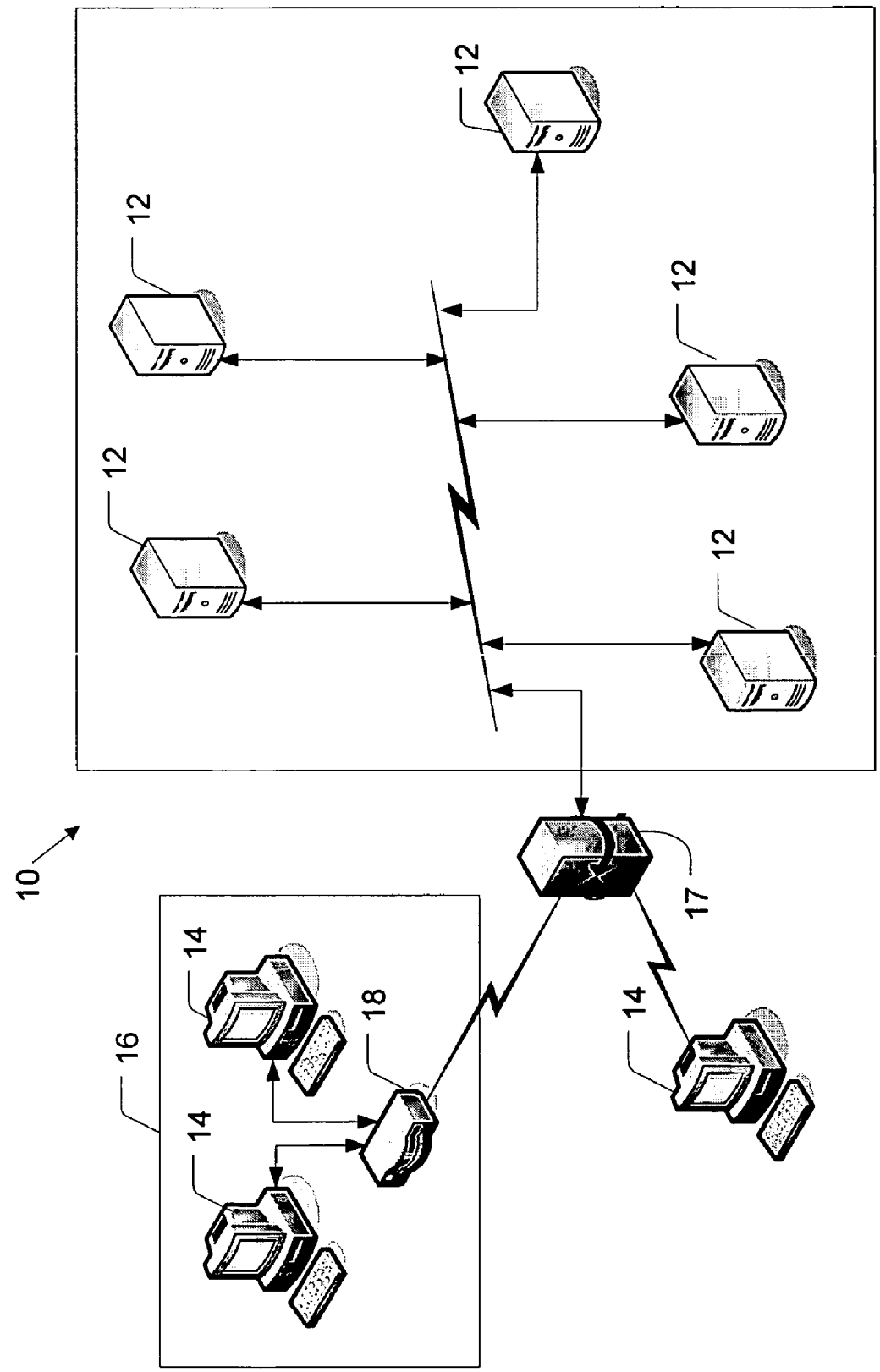
FIG. 1 is a block diagram of a wide area network environment which may host an embodiment of the present invention.

FIG. 1 shows a wide area network 10 formed by a plurality of network server computers 12 which are interlinked. Each network server computer 12 stores documents accessible to other network server computers 12 and to client computers 14 and networks 16 which link into the wide area network 10. The configuration of the wide area network 10 may change over time as client computers 14 and one or more networks 16 connect and disconnect from the network 10. For example, when a client computer 14 and a network 16 are connected with the network server computers 12, the wide area network includes such client computer 14 and network 16. As used herein the term computer includes any device or machine capable of accepting data, applying prescribed processes to the data, and supplying results of the processes.

The wide area network 10 stores information which is accessible to the network server computers 12, remote networks 16 and client computers 14. The information is accessible as documents. The term document as used herein, includes files (as per the Windows operating system usage), documents (as per the MacOS operating system usage), pages (as per the web phraseology usage), and other records, entries or terminology used to describe a unit of a data base, a unit of a file system or a unit of another data collection type, whether or not such units are related or relational.

The network server computers 12 are formed by main frame computers minicomputers, and/or microcomputers having one or more processors each. The server computers 12 are linked together by wired and/or wireless transfer media, such as conductive wire, fiber optic cable, and/or microwave transmission media, satellite transmission media or other conductive, optic or electromagnetic wave transmission media. The client computers 14 access a network server computer 12 by a similar wired or a wireless transfer medium. For example, a client computer 14 may link into the wide area network 10 using a modem and establish a link to a gateway 18 (e.g., an a point of presence or aggregation point) for an IP or other wide area network. Alternative carrier systems such as cable and satellite communication systems also may be used to link into the wide area network 10. Still other private or time-shared carrier systems may be used. In one embodiment the wide area network is a global information network, such as the internet. In another embodiment the wide area network is a private intranet using similar protocols as the internet, but with added security measures and restricted access controls. In still other embodiments the wide area network is a private or semi-private network using proprietary communication protocols.

The client computer 14 may be an end user computer, and may also be a mainframe computer, minicomputer or microcomputer having one or more microprocessors. Further, the client computer 14 may be a cell phone, smart phone, personal digital assistant or other computing device. The remote network 16 may be a local area network, a network added into the wide area network through an independent service provider (ISP) for the internet, or another group of computers interconnected by wired or wireless transfer media having a configuration which is either fixed or changing overtime. Client computers 14 may link into and access the wide area network 10 independently or through a remote network 16. For example, computers 14 may be coupled to a router 17 which accesses the wide area network through a gateway 18.

Computer System

Figure 2:
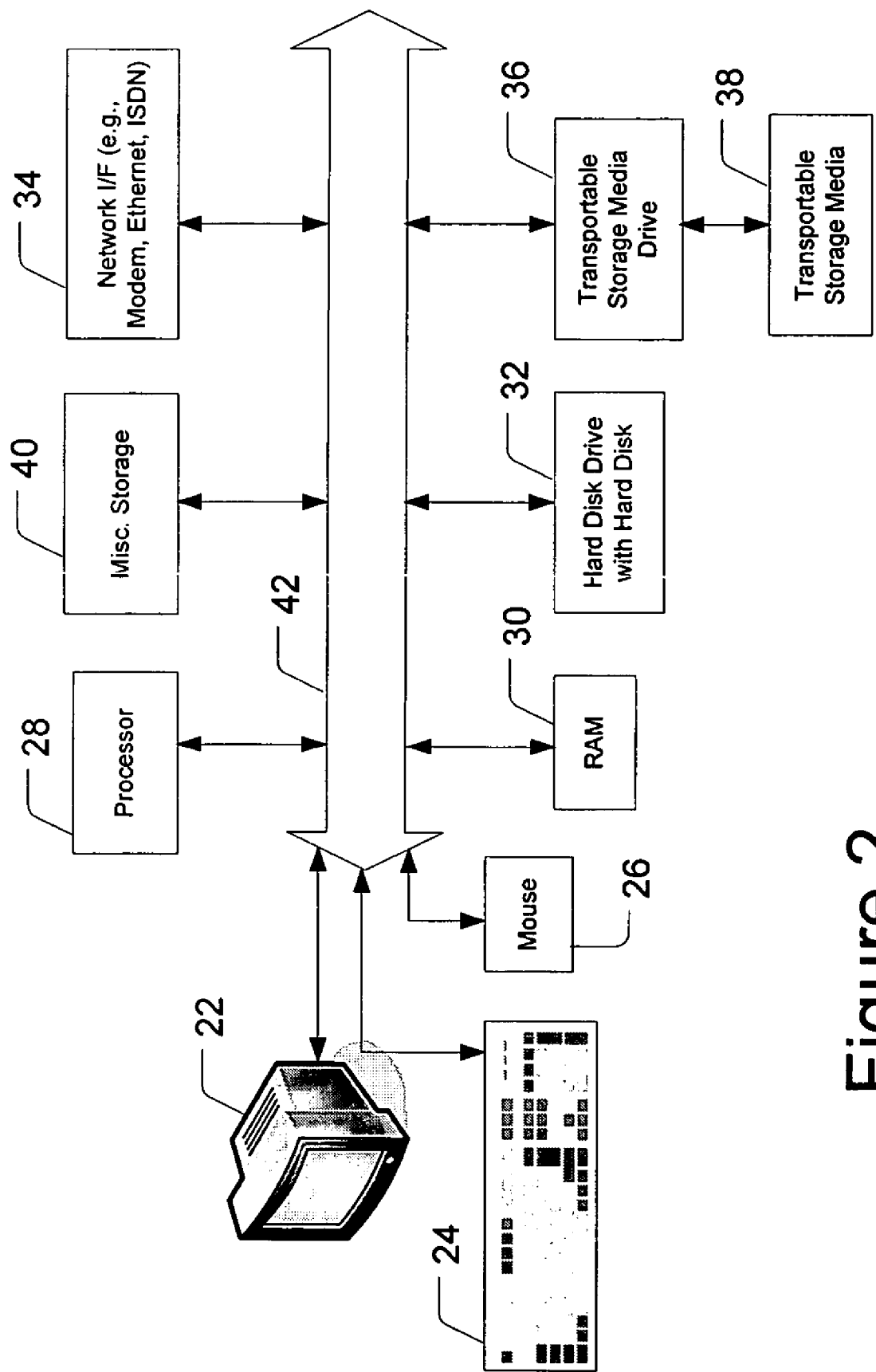
FIG. 2 is a block diagram of an exemplary computer system that may embody a user computer or server computer for hosting one or more processes described in the detailed description.

The functions of the present invention preferably are performed by programmed digital computers of the type which are well known in the art, an example of which is shown in FIG. 2. A computer system 20 includes a processor 28, random access memory (RAM) 30, a non-volatile storage device such as a hard disk drive 32, and a communication or network interface 34 (e.g., modem; ethernet adapter). In addition, a computer system may include a display monitor 22, a keyboard 24, and a pointing/clicking device 26. In addition other devices may be included, such as a transportable storage media drive 36 which reads transportable storage media 38, or other miscellaneous storage devices 40, such as a floppy disk drive, CD-ROM drive, zip drive, bernoulli drive or other magnetic, optical or other storage media. The various components interface and exchange data and commands through one or more busses 42. The computer system 20 receives information by entry through the keyboard 24, pointing/clicking device 26, the network interface 34 or another input device or input port. The computer system 20 may be any of the types well known in the art, such as a mainframe computer, minicomputer, or microcomputer and may serve as a network server computer 12, remote network 16 computer or a client computer 14. The computer system 20 may even be configured as a workstation, personal computer, network server, or a reduced-feature network terminal device. Further the computer 20 may be embodied as a cell phone, smart phone or personal digital assistant (PDA).

Cleaner Overview

A system and process are described for generating a custom cleaner that is responsive to a given state of a user computer. The general process described is related to handling a single Custom Cleaner Request, although it should be noted that a single Custom Cleaner solution can address multiple infections on a given machine, and that the invention can easily be implemented to handle systems that may require multiple Custom Cleaners. The general process is described with regard to a virus and a computer 'infection' for purposes of illustration, and applies equally to other sources of a malicious effect on the user computer. The cleaning system and process applies also to undesired spyware, undesired adware and other malware, and to computer objects and resources that may become corrupted, damaged, undesirably burdened or otherwise changed in an undesirable manner. As used herein a user computer undergoes a malicious effect by the mere presence of a computer virus, undesired spyware, undesired adware or other malware, whether or nor active, and whether or not computer system resources or objects have been damaged. As used herein a user computer also undergoes a malicious effect when system resources or objects become corrupted, damaged, undesirably burdened or otherwise changed in an undesirable manner. Further, the user computer undergoes a malicious effect as the term is used herein in the presence of other data, instructions, code or other software, firmware or digital object deemed as undesirable. The term malware as used herein includes computer viruses, spyware, adware and other data, instructions, code or other software, firmware or digital object deemed as undesirable. It is noted that what is undesirable to one user may be desirable to another, and may even be a viable product of a vendor. It will be apparent to one skilled in the art that the present invention may be practiced in other embodiments that depart from these specific details.

In an embodiment, the process for recognizing the need for a Custom Cleaner, the information gathered relating to the user's system, the information gathered relating to any suspicious attributes of computer resources and objects, the initiation and handling of the Custom Cleaner Request, and the retrieval and execution of the Custom Cleaner are fully automated and require minimal or no user input. In some embodiments it may be desirable to include steps for allowing user approval of the cleaner request and custom cleaner execution. Various objects may become 'infected' on a user's machine, including but not limited to: files, directories, registry entries, Layered Service Providers (LSP's), file contents, services, running processes and modules, browser helper objects, and browser cookies.

Figure 3:
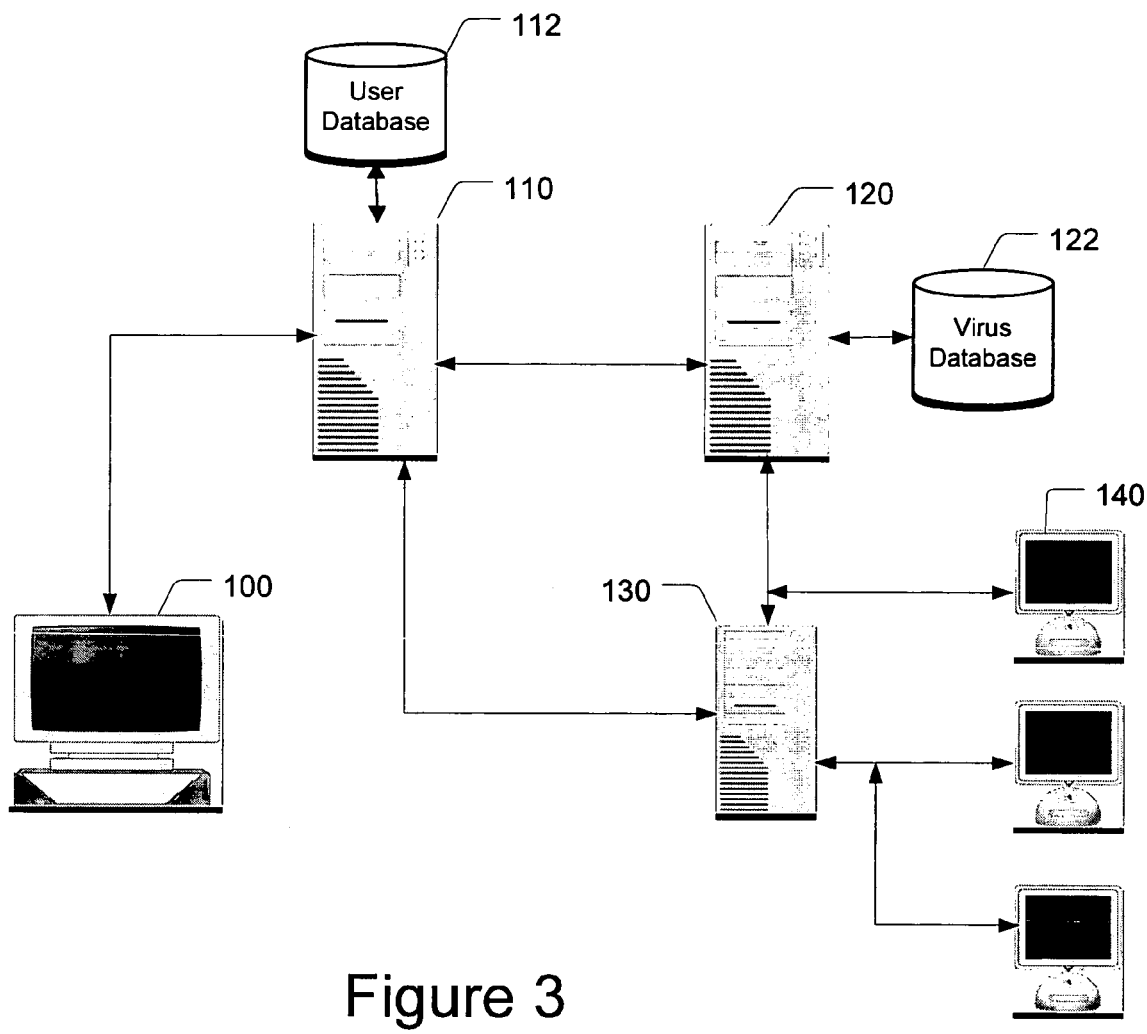
FIG. 3 is a diagram of another exemplary host environment for carrying out an embodiment of the invention.

FIG. 3 illustrates a system architecture which may be used in the processes of an exemplary embodiment. A virus scanning software program, such as the eAcceleration™ StopSign™ Virus Scanning Application (herein referred to as Scanner), executes on the personal computer 100 of a user. The system may include a server 110 which executes a process for receiving and processing Custom Cleaner Requests. Server 110 is also responsible for the posting and notification of Custom Cleaners once they have been generated and ready for download by the user. This server has access to read, write, and manage a user database 112 allowing the management of an individual Custom Cleaner Request with that of an individual user. The system also comprises of a server 120 capable of a executing a process for parsing and analysis of the Custom Cleaner Request. As part of the analysis of the request the server 120 access a Virus Database 122 where it will compare the information provided in the Custom Cleaner Request with known instructions for removing the infection. Database 122 can be modified through any of the database specific methods to add additional virus data for future comparison operations. In the event there are no matches found during the analysis an escalation process may be executed. To receive the escalation request the system may include a Technical Support Server 130, responsible for receiving escalation requests, parsing the information within a request, and notifying individual Support Technicians 140 that there is a need for human development of a Custom Cleaner. Once a Custom Cleaner has been created, it is posted to server 110, where it can be downloaded and executed on the user's computer.

For ease of description and functional separation, FIG. 3 depicts separate physical server machines for handling each portion of the overall process. This is done for convenience and one skilled in the art will recognize that the processes described above may reside on one physical machine or a series of machines capable of handling such processes.

Figure 4:
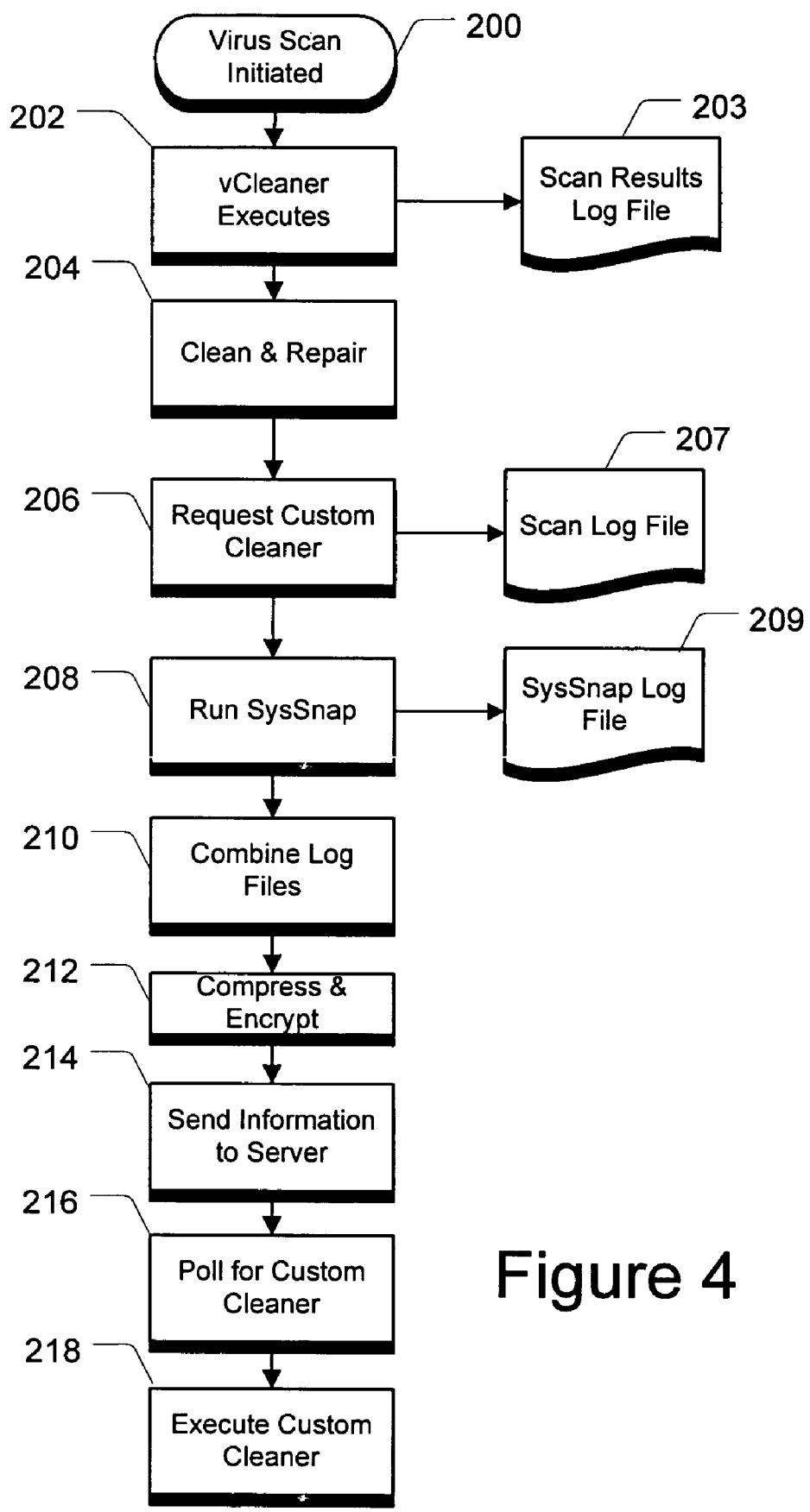
FIG. 4 is flow chart of an embodiment of a scanning application executed at a user computer.

FIG. 4 is flow chart of a process 200 which may be performed by a virus Scanner application executing on the user's computer 100. The scan process 200 may be initiated in various manners, such as in response to a user command, in response to a timer preset by the user, or in response to an event such as a system-level file-access request. When the application has been instructed to scan the computer, a vCleaner engine 202 is initiated. The vCleaner engine is a software module which scans computer 100 resources and objects. The engine 202 also may perform an analysis to determine whether the resources or objects include any suspicious attributes, such as known patterns, specific file names, or anomalies. For example, known malware may have a specific process name. Known viruses may have a characteristic bit pattern. Unknown malicious sources may create an anomaly in an expected object or an anomaly to an pattern in an object. In one embodiment this is performed by comparing resource and object attributes with data provided in a definition file. For example the definition file may include file names of known spyware, adware, viruses or other malware; or specific bit patterns which may be the signature of a known virus. One skilled in the art will appreciate the many types of definitions that may be included in a definition file. If the attributes of a resource of object correspond to a definition in the definition file, then the scanner considers the object to be malicious, (e.g., a source of a malicious effect or an infection demonstrating a malicious effect). Malicious data may be that of a virus, spyware, adware or other malicious software that is undesired or is potentially harmful to the operation and functionality of a user's computer. During the process of analysis the vCleaner writes the results of each file analysis to a Scan Results Log file 203. When the vCleaner determines a file or files to be malicious the vCleaner will attempt to clean or repair 204 these files. If the vCleaner is unable to clean or repair the infected files it will then initiate the Custom Cleaner process 206. The Custom Cleaner process creates a log file 207, which contains specific file and naming information related to the virus or infection file name, and location in the computer file system. To gather additional data about the user's computer the Custom Cleaner process may execute a process 208 for capturing a 'snapshot' of system information. Such process is referred to herein as SysSnap™, although other processes may be used. SysSnap 208 gathers specific information about the user's computer and writes the information to a log file 209. Upon the completion of SysSnap the Custom Cleaner process combines the log files 210 into one contiguous text file. The text file is then compressed and encrypted 212 to reduce the size and provide security prior to sending at step 214 the file to the Custom Cleaner Server 110. The Scanner application frequently polls at step 216 the Custom Cleaner Server 110 to receive notification that a Custom Cleaner is ready for download and execution. Upon notification, the Scanner downloads and executes 218 the Custom Cleaner on the user's machine.

For purposes described herein, cleaning of a machine can result in the deletion or quarantining of a particular file or group of files, removal of an application, process control, or the removal or a given set of bytes embedded in a file.

Figure 5:
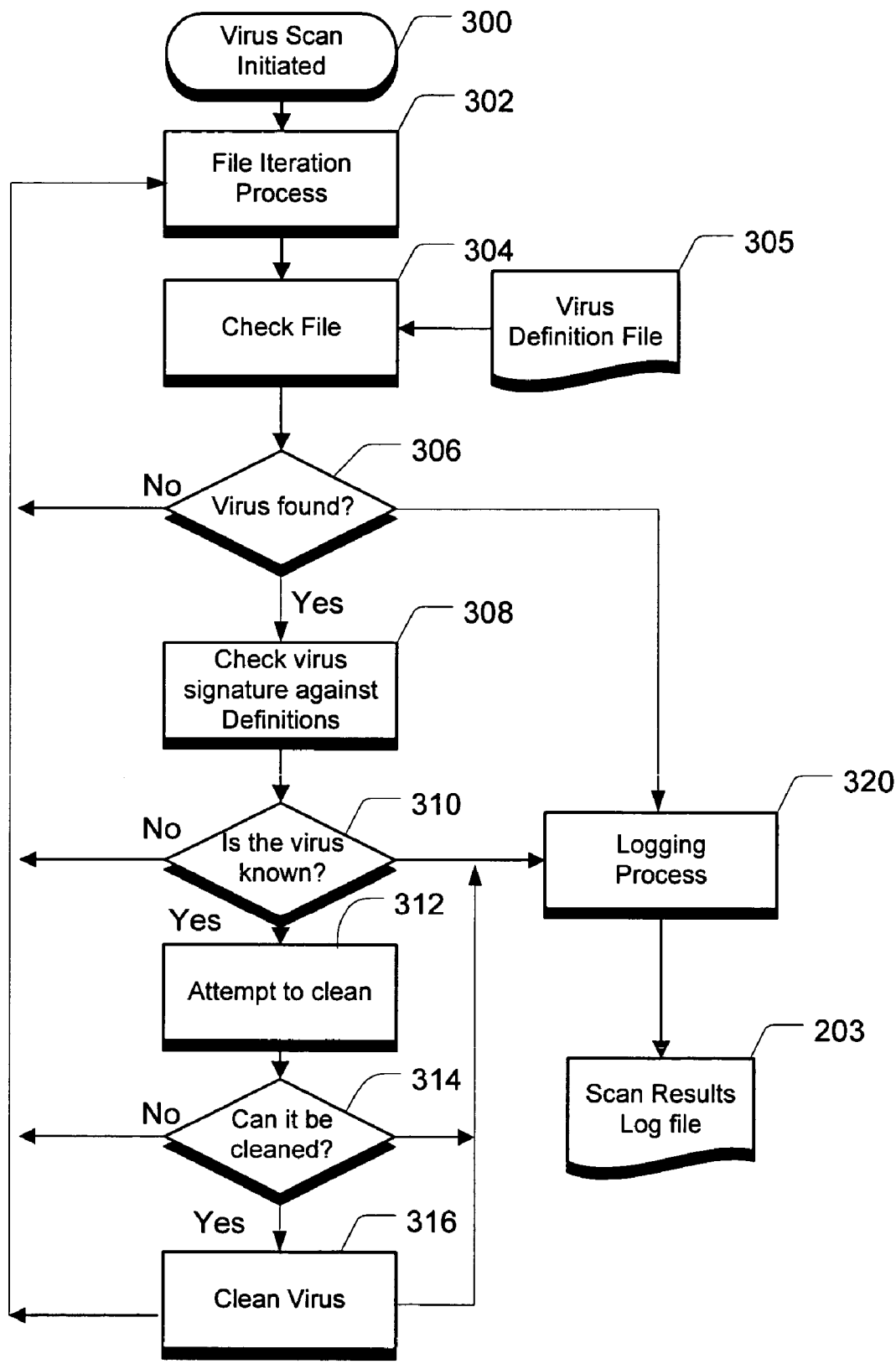
FIG. 5 is a flow chart of an embodiment of a process for checking computer objects for suspicious attributes.

FIG. 5 provides a further detailed illustration of the virus cleaning process 300 presented. The vCleaner processes the files and other objects on a given system using an iteration process 302. For purposes of discussion, the vCleaner process is described in the context of checking files for viruses, although other object also may be checked, and other malware definitions may be included. During the iterations, a check file process 304 examines a file against a virus definition file 305 to determine if there is a match between the file on the system and the data file. If a virus or malware is found 306, the vCleaner must check to see if it knows how to clean the infection. It compares the virus or malware signature found against its database 308 of known infections it can cure/clean. In the event no virus or malware is found, the check file process 304 returns to the file iteration process 302 to check the next file. If a virus or malware is found, but at step 310 is determined to be unknown or determined that a cleaning procedure is not found in the database 305, then the information is logged into a log file 203 at step 320 and the process returns to the file iteration process 302 to check the next file. If a virus or malware is found and the cleaning procedure is found, vCleaner then attempts to clean 312. The result of the cleaning attempt is checked 314. If the cleaning attempt was successful then the virus or malware was cleaned 316, the results are logged 320, and the process return to the file iteration process 302 to check the next file. If the cleaning attempt was unsuccessful, the results are logged 320 nto a log file 203 and the process is returned to the file iteration process 302 to check the next file.

Regardless of the results, the check file 304 process provides result data to a logging process 320 responsible for gathering scan data and writing it to a Scan Results Log File 203. This logging process continues throughout the operation of a vCleaner scan. Also logged is data to identify whether or not a virus or malware was found 310, whether the infection cleaning procedure was found 312, and whether the infection was in fact cleaned 314.

Figure 6:
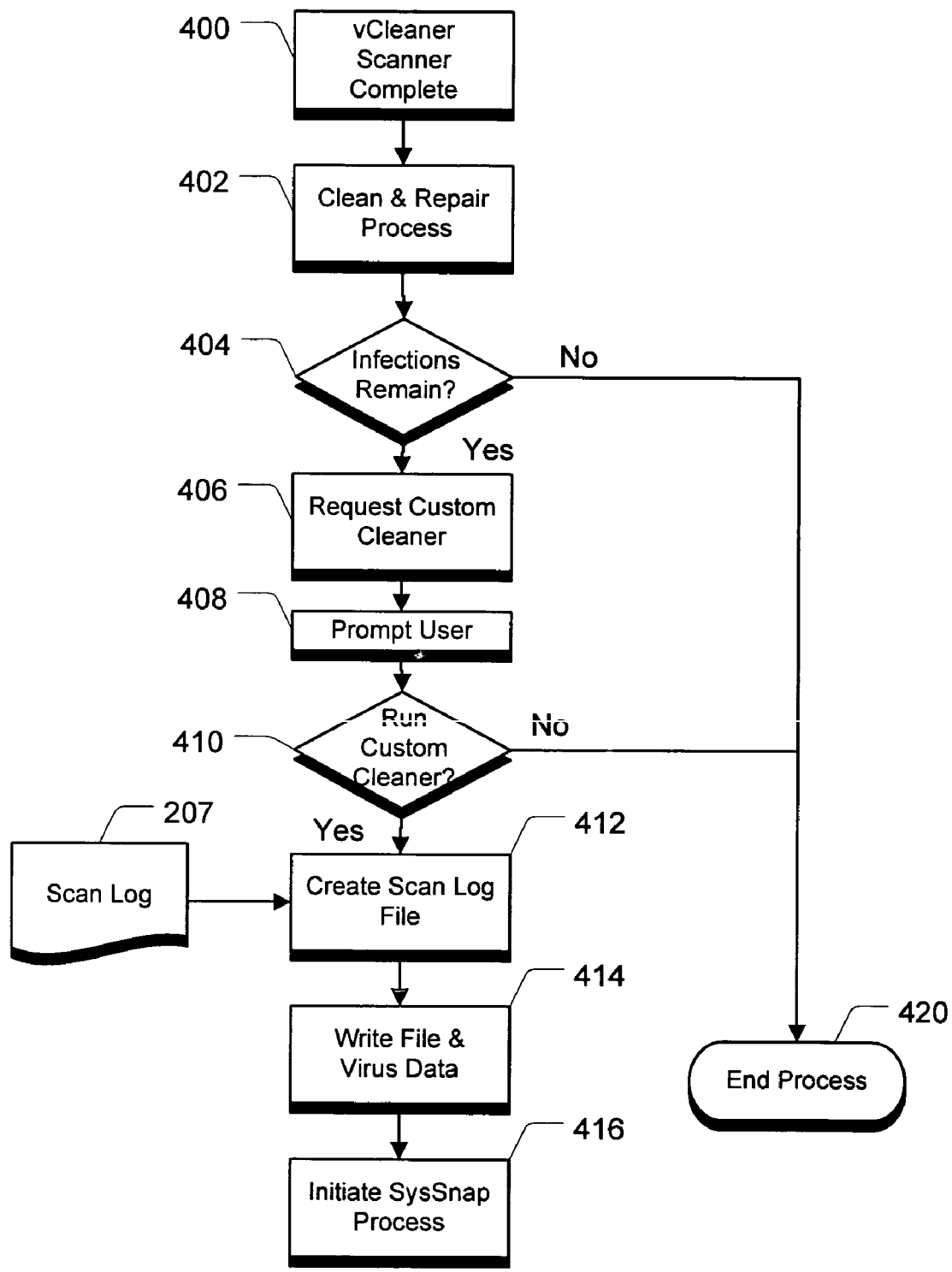
FIG. 6 is a flow chart of an embodiment of a procedure for determining whether to request a custom cleaner.

Referring to FIG. 6, once the scan is complete at step 400, the Scanner will attempt to automatically clean 402 the infections that are found on a user's computer. If at step 404 infections still remain, the Scanner application will recognize the need for a Custom Cleaner at step 46. It will prompt the user at step 408 to build a Custom Cleaner Request. If the user does not wish to generate a Custom Cleaner Request, the process ends at step 420 and the Scanner returns to is normal idle state. If the user wants to generate a Custom Cleaner Request a Custom Cleaner Request process may create a log file 412 to write the infected file and virus information 414 resulting from the previous system scan. Once this data has been logged the Custom Cleaner Request process initiates SysSnap at step 416 to gather specific information to the user's computer.

In another embodiment, a Custom Cleaner Request is generated automatically without user input or permission.

Figure 7:
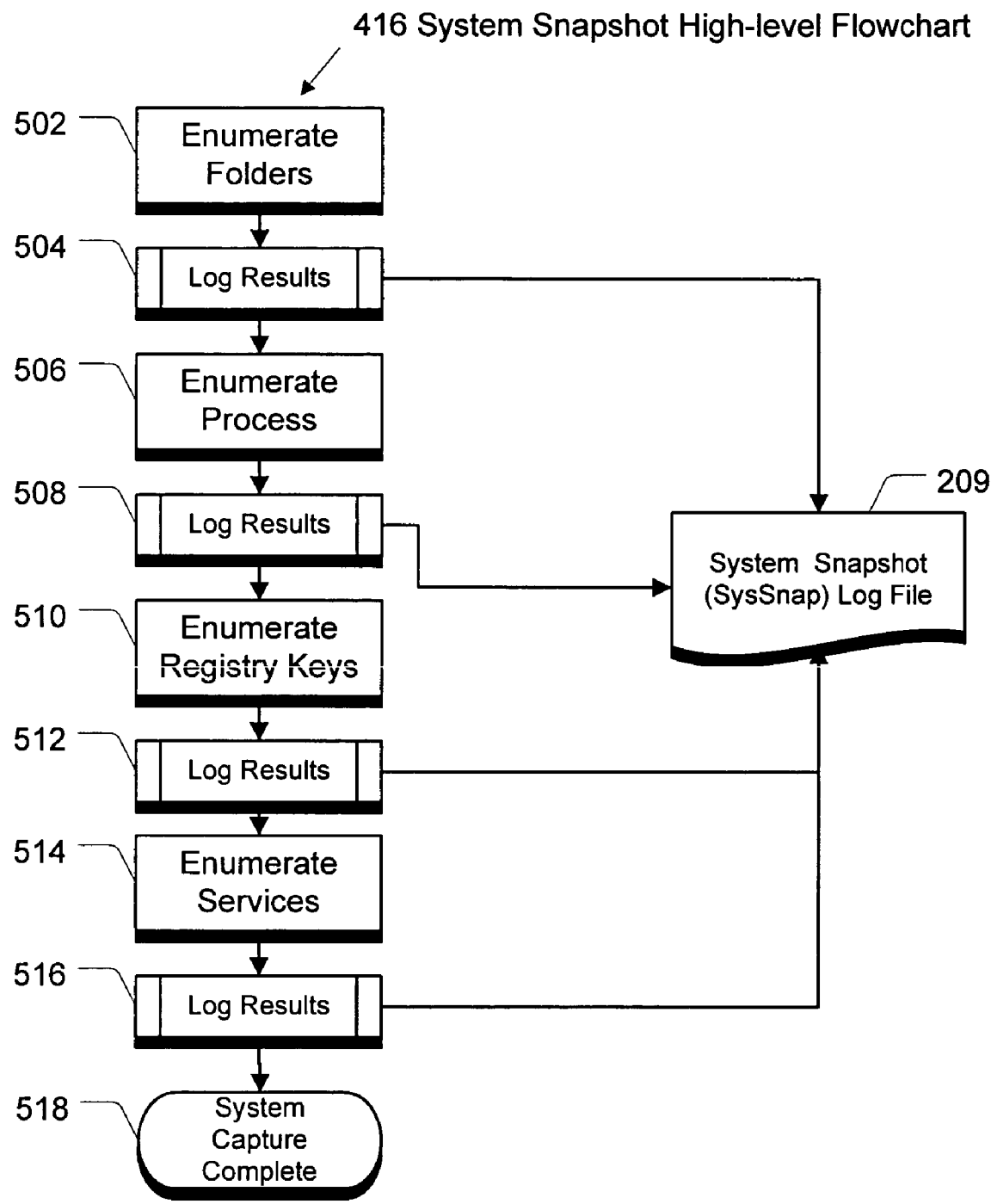
FIG. 7 is a flow chart of an embodiment of a process for gathering system information pertaining to a user computer.

As illustrated in FIG. 7, the system capture tool, SysSnap, in one embodiment may be initiated as the first process after a request to generate a Custom Cleaner has been made. The SysSnap tool performs an analysis of the infected computer, gathering relevant data and writing the gathered data to a SysSnap Log File 209. SysSnap starts its operation by enumerating specific file folders at step 502 and logging the results at step 504 into the system snapshot log file 209. SysSnap, for example, may use operating system provided system application program interfaces (API's) for processing the file system, such as Microsoft™ Windows™ API calls FindFirstFile, and GetFileAttributes. Next, SysSnap may enumerate and log processes at steps 506 and 508 using operating system provided functions such as those in the Windows Tool Help library. In the next steps 510-512, SysSnap enumerates and searches registry keys and their values, logging entries of interest. Specific API's used from Windows are the RegEnumKey and RegQueryinfoKey interfaces. Additionally at steps 524 and 526, the SysSnap process also enumerates services using the Windows SCManager API functions, logging services of interest, and completes at step 518.

Figure 8:
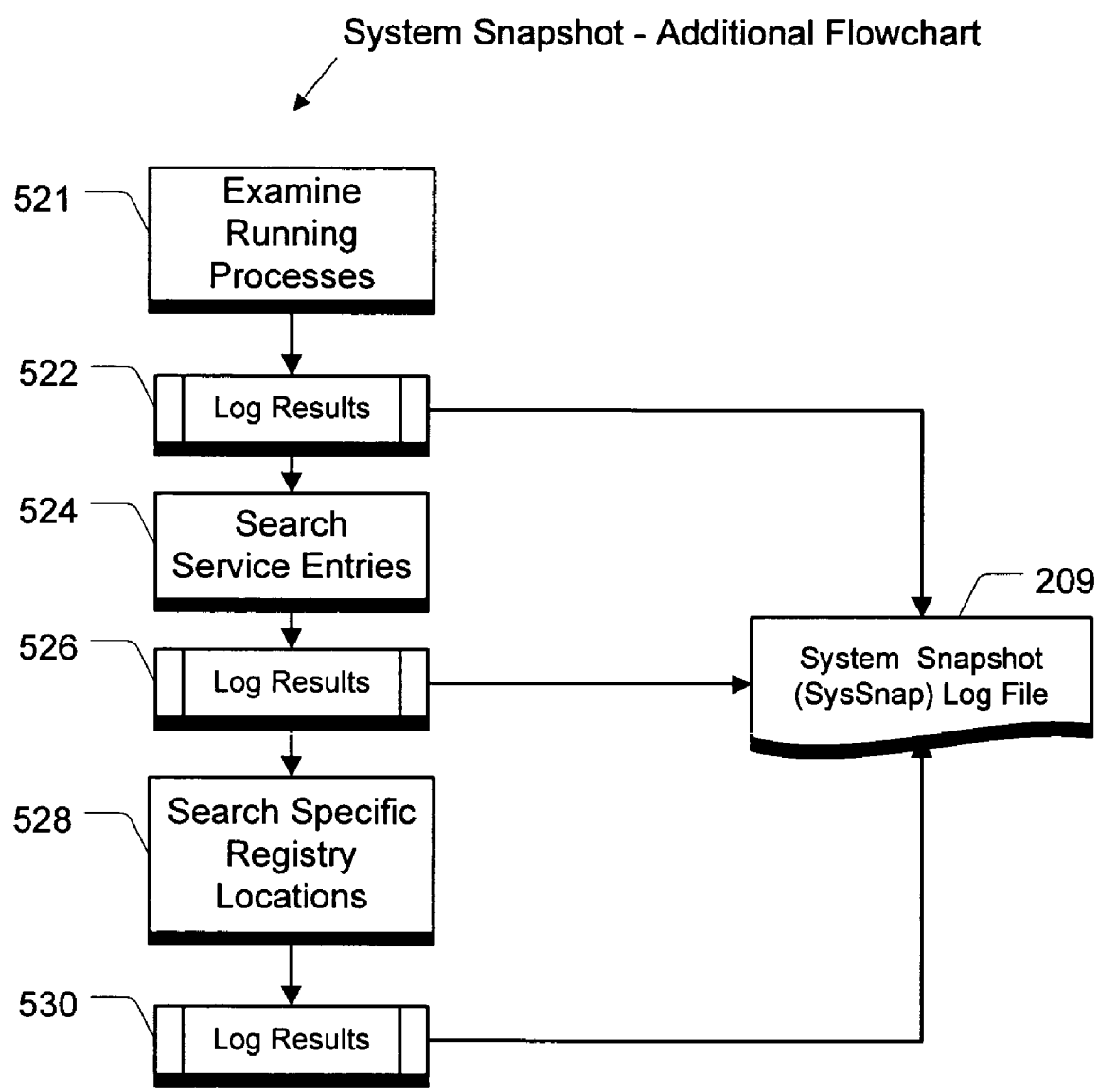
FIG. 8 is a flow chart of additional operations that may be performed to gather system information in another embodiment of the process of FIG. 7.

Referring to FIG. 8, in some embodiments SysSnap may also gather addition information to aid Support Technicians in determining how to effectively remove the infection. For example, SysSnap may be configured to examine currently running processes at step 521 in order to determine if the virus is currently executing. Processes determined to be that of a virus as well as otherwise unknown processes, are logged at step 522 to the SysSnap log file 209. The additional search may also examine the Services entries at step 524 to determine if the virus is running as a service and therefore needs to be shutdown through the standard operating system service interface, logging entries of interest at step 526. SysSnap may also examine all of the most common registry locations at step 528 (e.g. startup locations) to find out if and when the virus or malware is being executed at boot-up time. As illustrated in steps 522, 526 and 530 of FIG. 8, the process log the results to the SysSnap log file 209. In an exemplary embodiment SysSnap creates a full log each time it runs.

Figure 9:
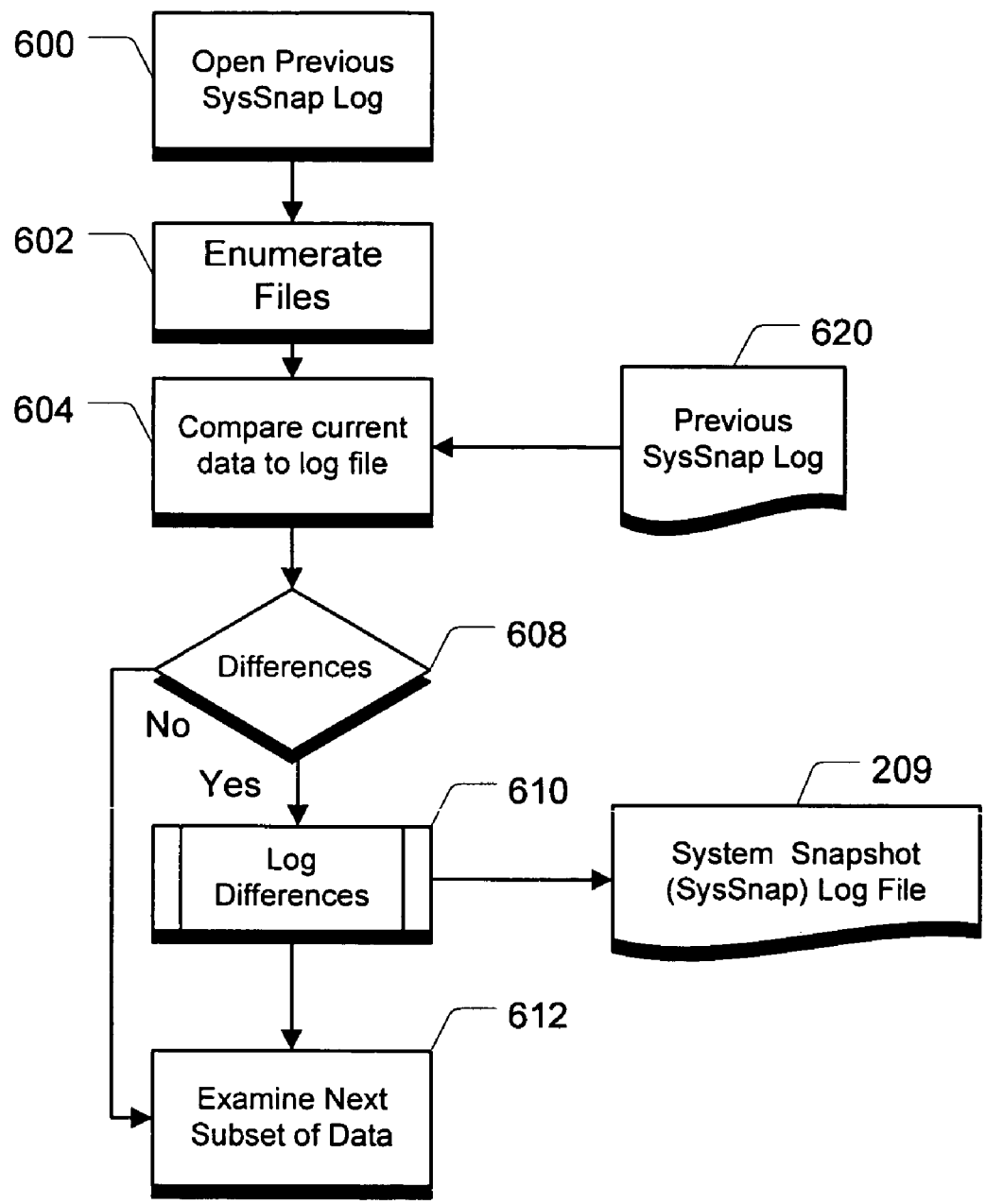
FIG. 9 is a flow chart of an embodiment of an alternative process for gathering system information pertaining to the user computer.

Referring to FIG. 9, in an alternative embodiment, SysSnap can create partial logs or information, or logs of the changed system items. At step 600 a previous SysSnap log file is opened. At step 610 the files are enumerated, then compared at step 604 to a prior log file 620. For example, the last saved SysSnap log file 620 may stored in the user's computer after each time the SysSnap process is executed. If there are no differences at step 608, then at step 612 the next subset of data is examined and compared. If there are differences then the differences are logged at step 610 into a current SysSnap log file 209. In one embodiment SysSnap gathers information from the same locations. Unless the system state has changed the data, the data is expected to be the same. FIG. 9 illustrates the difference-logging operations performed on only on subset of the data gathered during SysSnap operation. This is done to only simplify the illustration and in no way limits the scope of the embodiment and its application to all steps of the system capture process.

In another embodiment, SysSnap has the ability to perform customized searches and logging. The additional or specific search and log functions can be initiated by the Scanner application, specific events or results, the user, and Support Technicians. The process for gathering uses the same system processes provided above, as well as custom search and retrieval methods provided by third party tools.

Individuals skilled in the art will recognize there are many ways to search, gather and log system data. The specific implementation is an engineering design decision, and in no way limits the scope of this embodiment.

Figure 10:
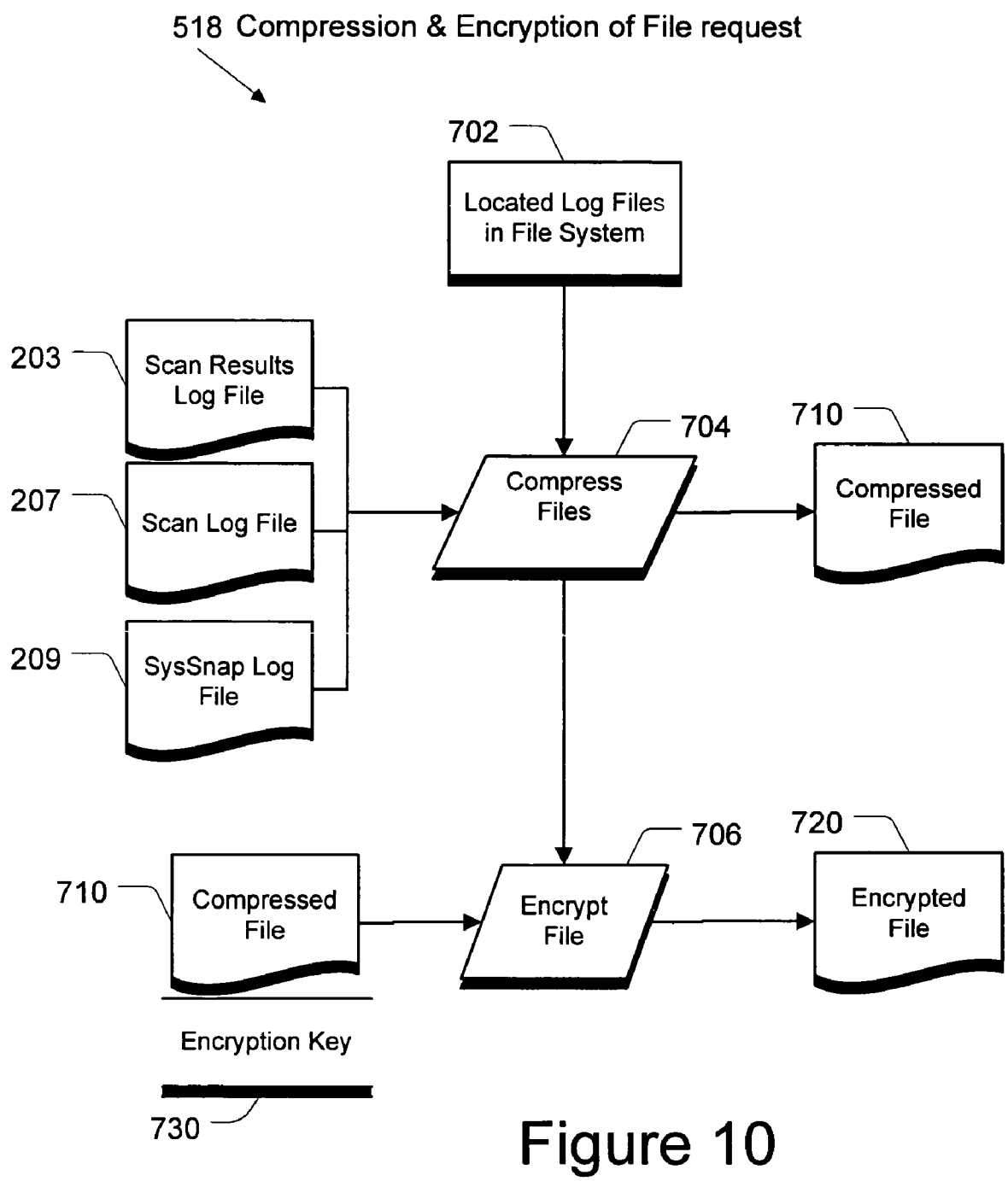
FIG. 10 is a flow chart of an embodiment of a process for preparing user computer information to be uploaded in a request for a custom cleaner.

Referring to FIG. 10, once the SysSnap process has ended and all information has been logged, in one embodiment the a process 702 is performed as part of the Custom Cleaner Repquest process to create a file to send to the Custom Request server 110. In one embodiment this file is a created by combining at step 704 the separate log files, Scan Results 203, Scan Log 207, and the System Capture Log 209 into a single compressed file 710. There are many known and standard compression techniques, any of which could be used to create a single compressed file. Once the single file 710 is complete it may be then encrypted at step 706 using for example an AES encryption algorithm having an encryption key 730. The output is a single encrypted file 720.

Figure 11:
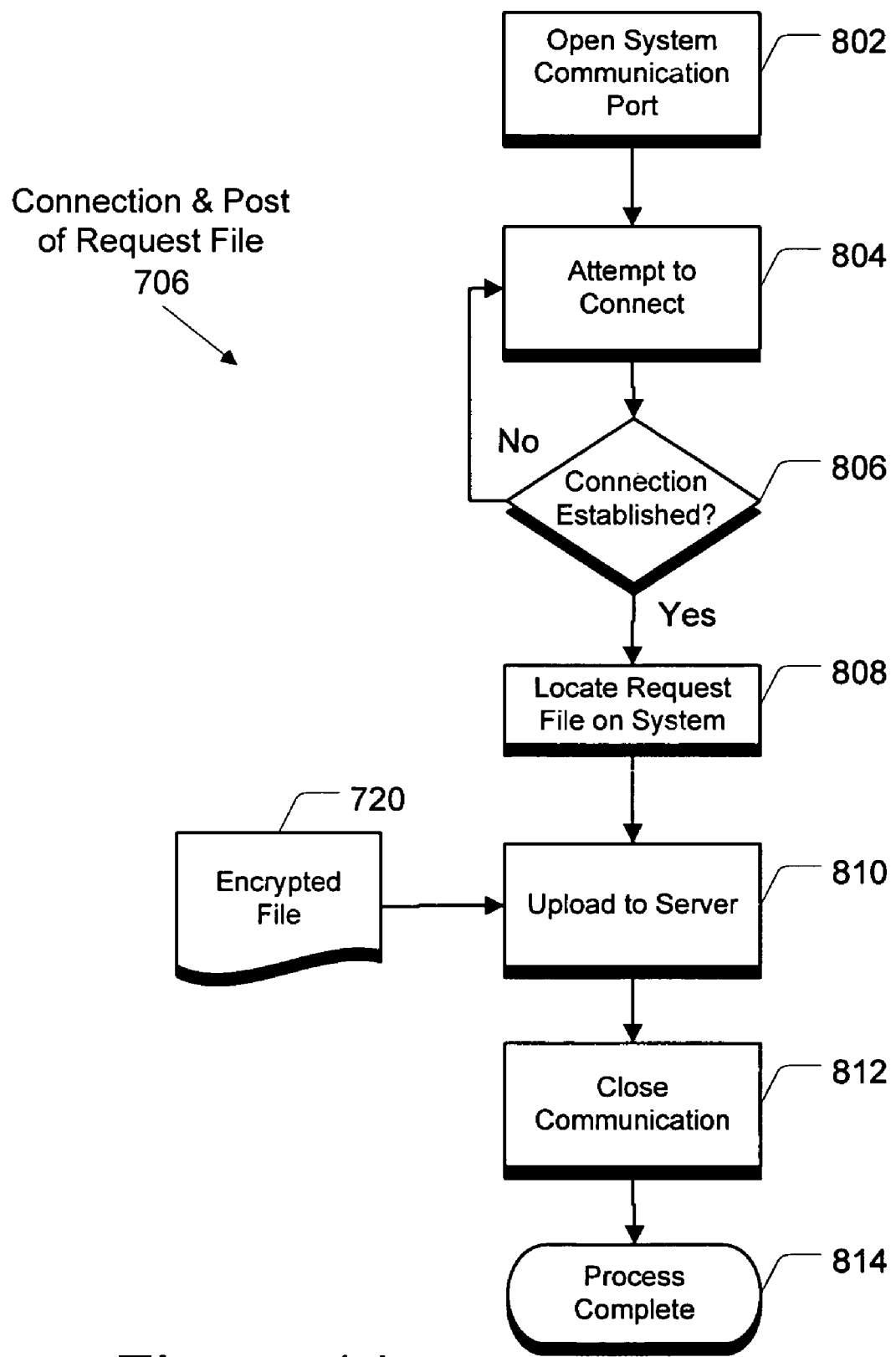
FIG. 11 is a flow chart of an embodiment of a process for uploading the user computer information to a server.

Referring to FIG. 11, the Scanner application opens a communication port at step 802, and attempts to establish at steps 804, 806 a connection with the Custom Cleaner Request Server 110. Once a connection has been established at step 808, the encrypted file 720 is uploaded at step 810 using for example an HTTP Post operation. After the file has been successfully uploaded, the communication port is closed 812. The communication process ends 814, and the Scanner application begins its polling process 216 waiting for updates from the Custom Cleaner Request Server 110.

Figure 12:
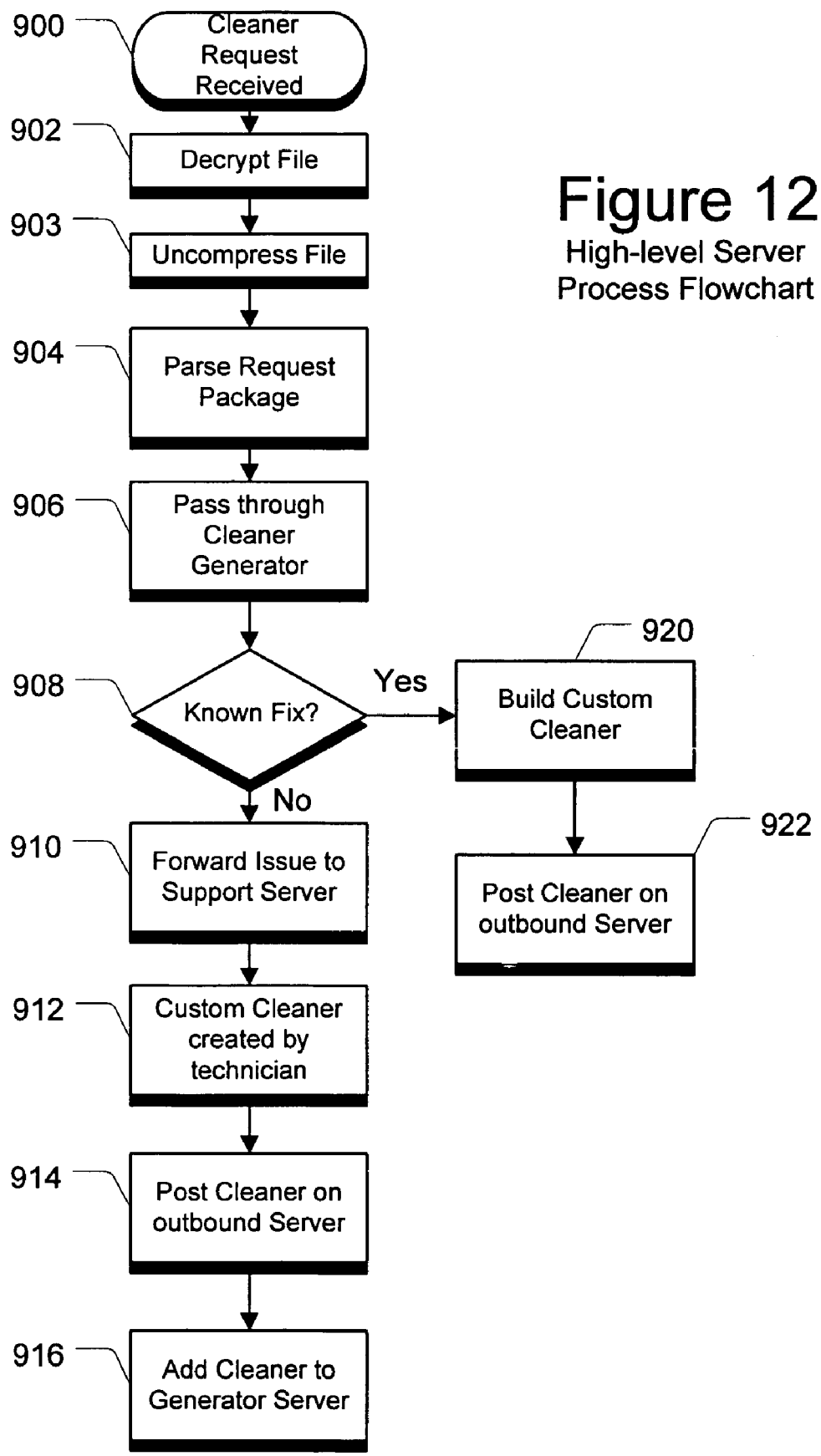
FIG. 12 is a flow chart of an embodiment of a process for analyzing the uploaded information at a location nonresident to the user computer.

FIG. 12 illustrates an embodiment of a process for receiving and generating a Custom Cleaner at the server 110. At step 900, notification that a Custom Cleaner Request has been posted is received. At steps 902-903 the file attached to the request is decrypted and uncompressed. At step 904, filter processes parse and format the uploaded information. The data is then passed to the Automated Cleaner Generator at step 906 to analyze the infection information to determine at step 908 whether the infections can be cleaned by a combination of known instructions. If so, the Generator automatically assembles the instructions at step 920 into a Custom Cleaner. Then at step 922 the Custom Cleaner is posted on an outbound server, where it is ready for download to the user's computer. Instructions are in a scripting language that the vCleaner component 218 of the Scanner can read and execute.

IF at step 908 analysis of the infection information determines that any of the infections from the data file are unknown, or insufficient instructions for cleaning are specified in the Automated Cleaner Generator database, or the instructions indicate a requirement of Support Technician intervention, then at step 910 an escalation occurs. For an escalation, the Automated Cleaner Generator automatically forwards the information to the Support Technicians Server 130. A Support Technician will then review the information provided by the Custom Cleaner Request and Automated Cleaner Generator and create a Custom Cleaner script at step 912. For example, the technician may write code for the specific scenario of information uploaded from the user computer in file 720. Once the script has been completed, it is then posted to an outbound server at step 914, where it is ready for download to the user's computer. In some embodiments the Support Technician may also add the script at step 916 to the virus database 122 used by the Automated Cleaner Generator, allowing for future automated use of this script.

Figure 13:
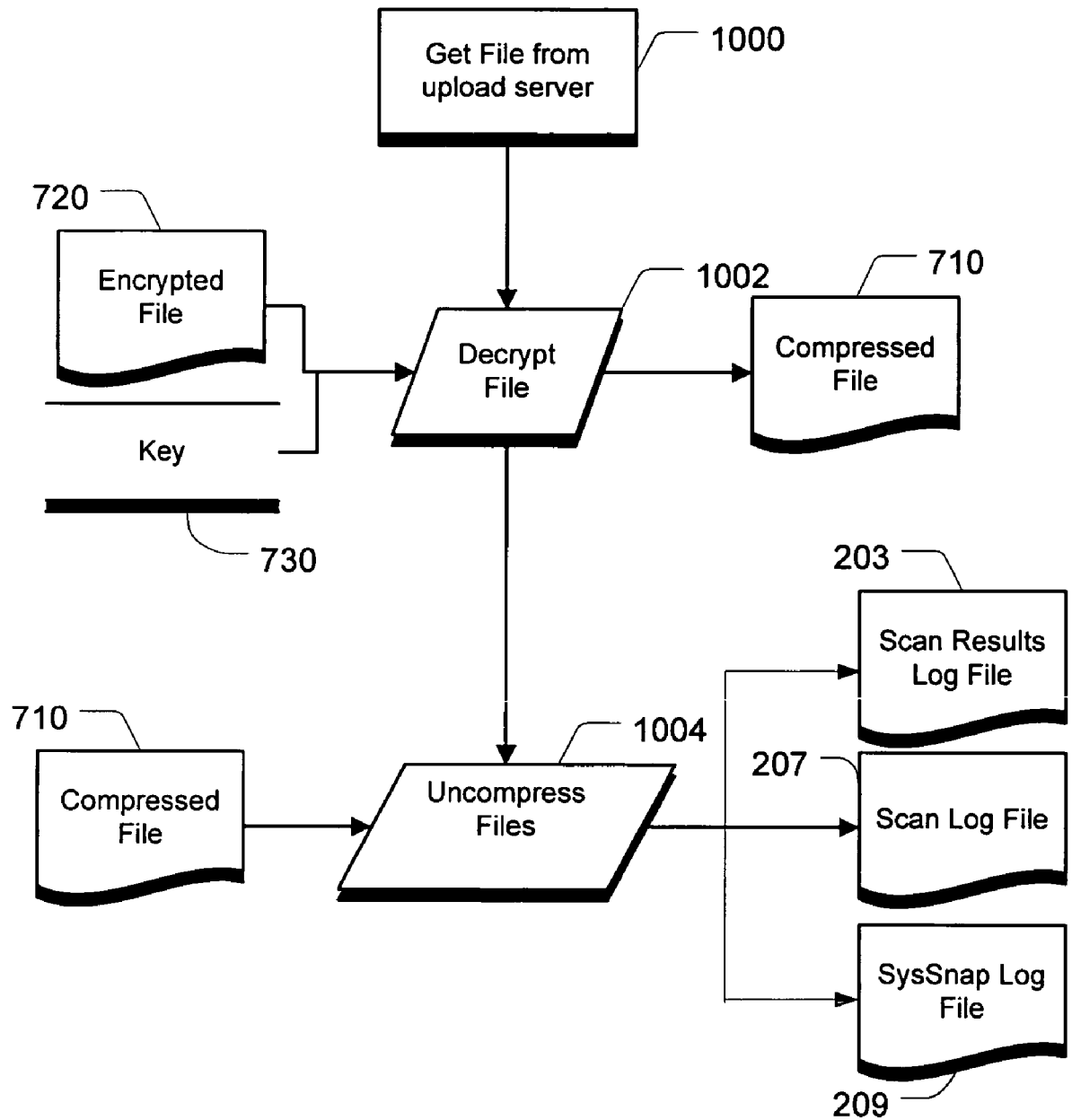
FIG. 13 is a flow chart of an embodiment of a process for preparing the uploaded information to be analyzed.

Processing of the Custom cleaner Request is now described in additional detail. Referring to FIG. 13, once notification is received at the upload server 110 that a file has been uploaded from user computer 100, the uploaded file 720 is retrieved. The file is then decrypted at step 1002 by passing in the encrypted file 720 and the key 730 to a decryption process. The output is the original compressed file 710. Next, the file 710 is uncompressed at step 1004, into the original three log files compiled from the user's computer: files 203, 207, 209. Referring to FIG. 14, in some embodiments the decrypted and uncompressed log files 203, 207, 209 may be added to the user account database 1100. The user database 112 (see FIG. 3) may store information relative to each individual user account, along with log files 203, 207, 209 that are generated each time a user requests a Custom Cleaner.

Referring to FIG. 15, in an alternative embodiment in which the log files contain only those portions of the user's system that changed as compared to the previous logs, a merge tool can combine the log files at step 1200 into one contiguous file 1202. One skilled in the art will recognize there are several well known methods for opening and combining multiple text files into one file. Any of these methods can be employed here without limitation of implementation.

Figure 16:
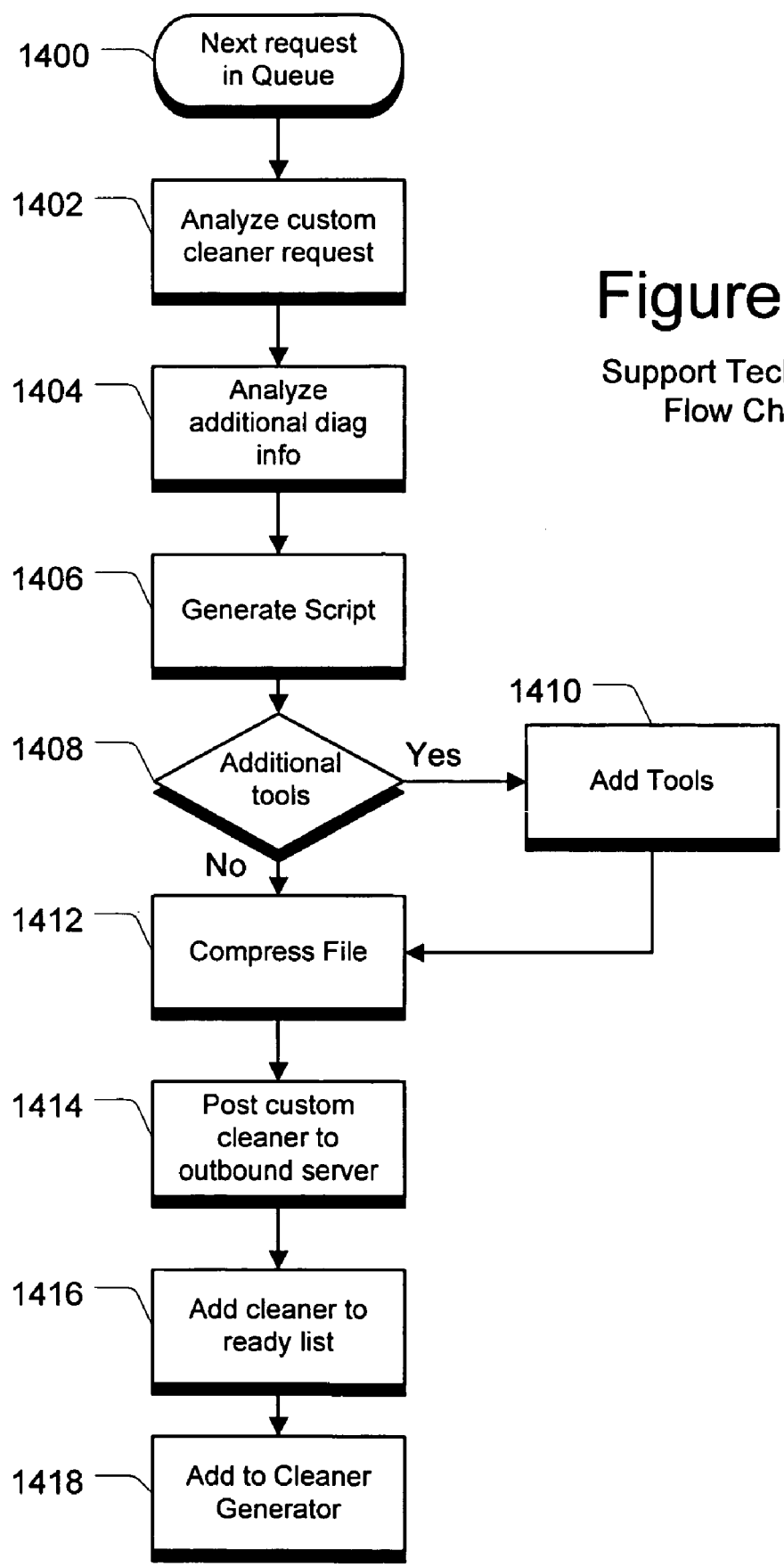
FIG. 16 is a flow chart of an embodiment of an escalation procedure preparing a custom cleaner.

Referring to FIG. 16, a flow chart for an escalation procedure is described. Prior to an escalation, the parsing process (see step 904 of FIG. 12) examines the log files, retrieving data relevant to the problem which will be needed by the Automated Cleaner Generator. This data may includes, although it is not limited to, operating system, operating system version, virus name, virus location, registry entries, virus location or other pertinent information. One this data has been collected it is then passed to the Automated Cleaner Generator. The data is compared to known entries of the same data.

In an example escalation, the Automated Cleaner Generator would first filter the request based on operating system type and search known solutions with the same operating system. Next the generator would search against the operating system type, limiting the scope with each data criteria. Next, the generator would search the name of the virus against its database to determine if it contains a solution for the virus identified by vCleaner.

Additional information may be sent from the Automated Cleaner Generator including any diagnostics hints or parameters. For example, the Automated Cleaner Generator may fail to determine an exact match for a virus name, but may find similar solutions for viruses with the same registry entries and process. This information can be sent as diagnostic hints to the Support Technician during the escalation process, allowing a more complete set of data to create a Custom Cleaner. This information is included in the escalation request sent to the technical support server 130.

The escalation request is received at step 1400, and placed in a queue for the next available Support Technician. The Support Technician who receives the next available Request from the queue, at steps 1402 and 1404 analyzes the infection information included with the Custom Cleaner Request and the additional information automatically generated (e.g., diagnostic hints).

The Support Technician is then responsible for creating a Custom Cleaner script at step 1406 from the provided information. After creating the Custom Cleaner instructions, the Support Technicians combines the script with any other necessary files or tools at steps 1408-1410. The Custom Cleaner may consist of a script or a script plus additional custom utilities and modules, and even a custom vCleaner engine. The Custom Cleaner is then compressed at step 1412 and uploaded at step 1414 to the Automated Custom Cleaner Server 110 using an automated system. The Support Technician, using a web interface, selects the Custom Cleaner and the recipient user and handles the upload of the Custom Cleaner file, adding an entry to a ready list at step 1416 that includes the recipient user's computer information and the URL of the Custom Cleaner.

An additional feature of this embodiment is that, if the instructions used in the custom cleaner are appropriate, they also may be entered into the Automated Cleaner Generator's database at step 1418 for future automation.

Figure 17:
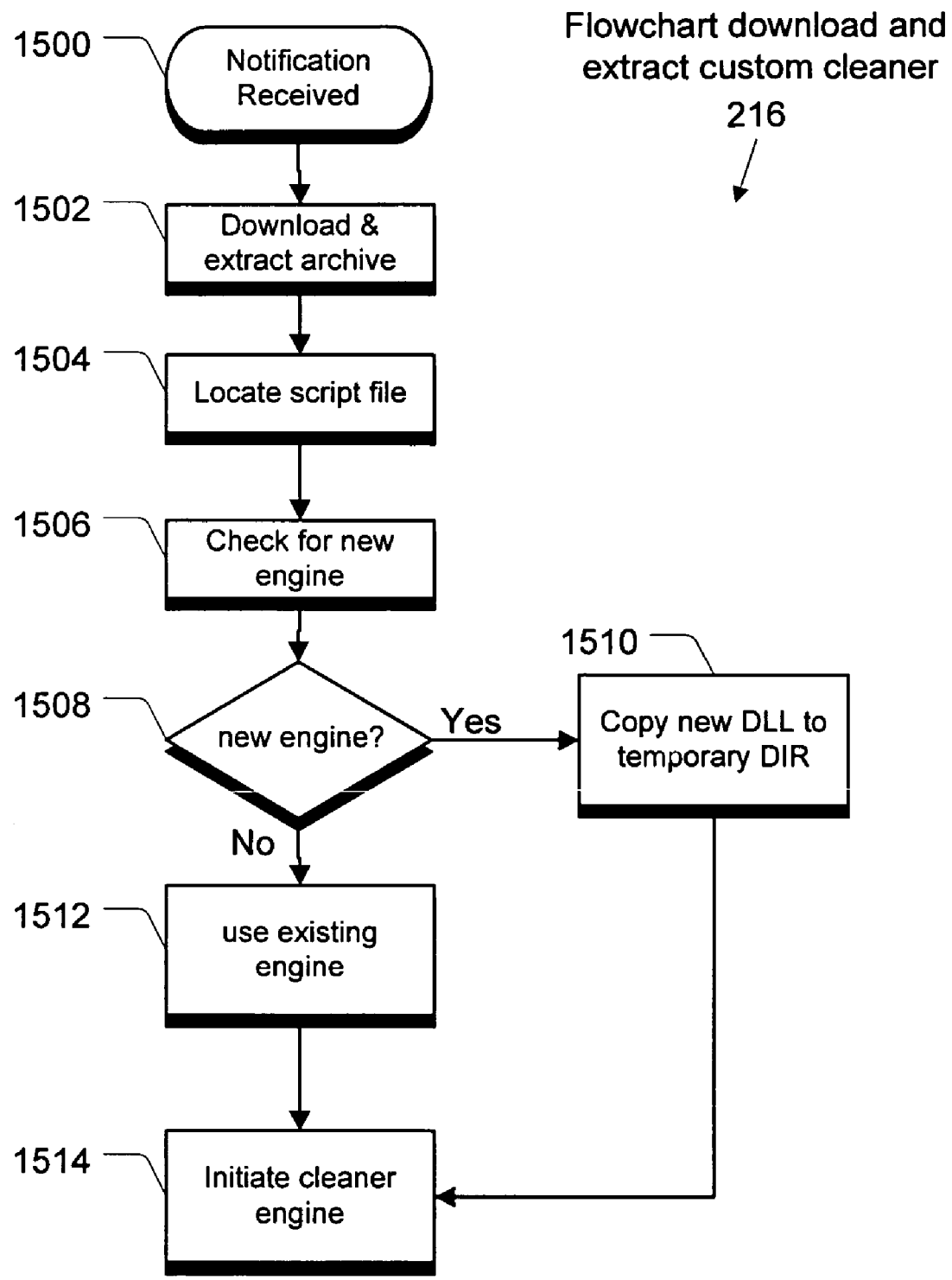
FIG. 17 is a flow chart of an embodiment of a process for downloading and initiating a custom cleaner at a user computer.

Referring to FIGS. 4 and 17, during the polling of the Custom Cleaner Server at step 216 for a Custom Cleaner, the Scanner application may receive notification that a Custom Cleaner is ready for download at step 1500. The Scanner application then downloads and extracts the Custom Cleaner at step 1502. For example, the Custom Cleaner may be packaged in a compressed and encrypted archive. The Scanner executes an extraction routine to extract the contents of the archive. Once the data is extracted from the archive and decrypted, the Scanner application parses through the archive contents at step 1504 seeking primary detect/cleaning instructions contained in a vCleaner Script file. The Scanner also may parse the archive at step 1506 to determine whether a copy of a scan engine (vlcnr.dll) is present (i.e., the application library responsible for detection and cleaning logic). If at step 1508 a copy of the engine is located in the archive, then at step 1510 the engine is copied into a temporary directory and at step 1514 a cleaning process is commenced using the newly downloaded library. If at step 1508 a copy of a scan engine is not located, then at step 512 the Scanner uses the version of the engine that is already present on the machine to initiate at step 1514 the cleaning process, (also see FIG. 4 at step 218).

Figure 18:
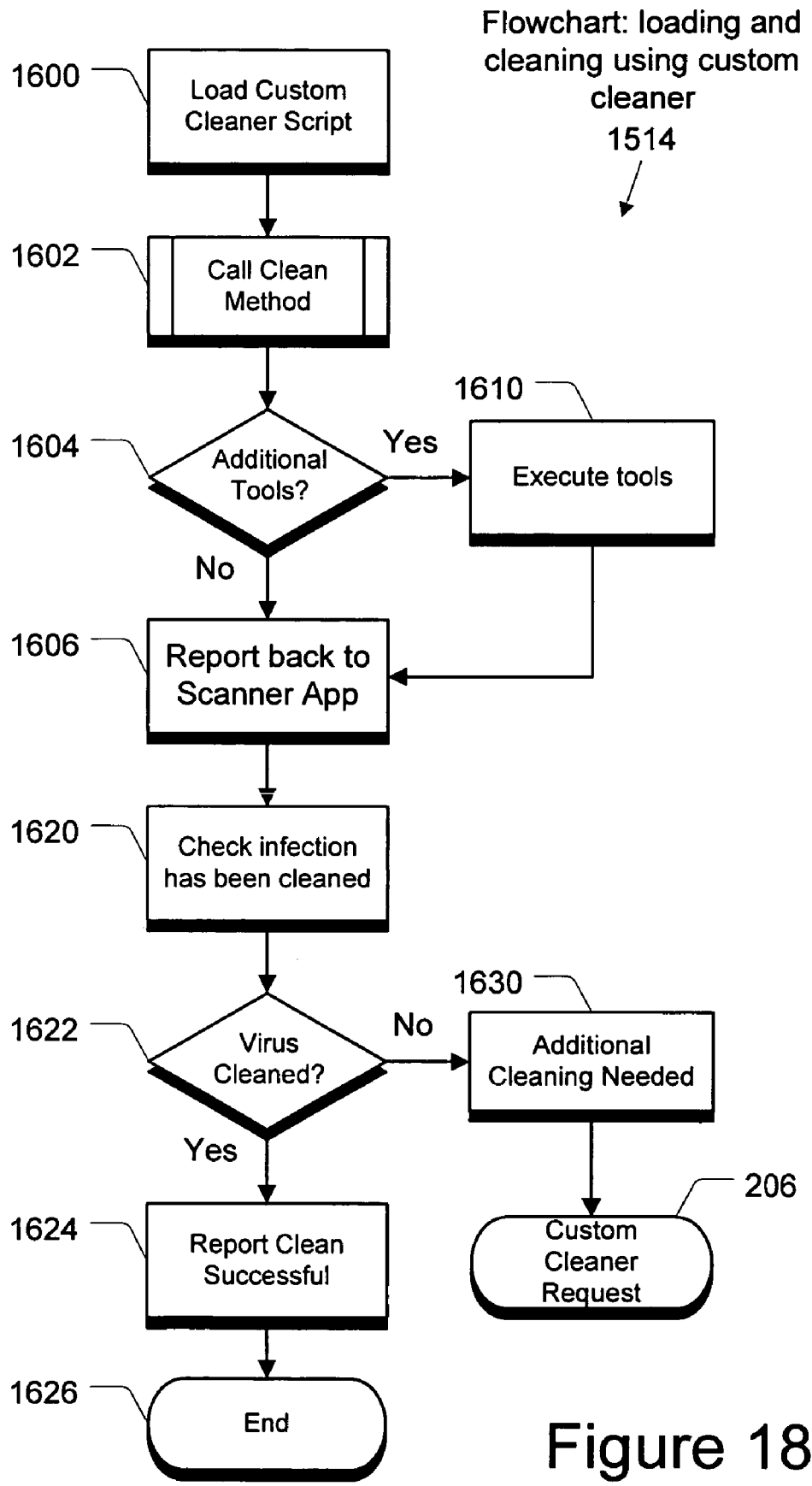
FIG. 18 is a flow chart of an embodiment of a process for loading and verifying a custom cleaning solution at the user computer.

Referring to FIG. 18, a cleaning process using a custom cleaner is described. At step 1600 the Scanner loads the scan engine and cleaning instructions located in the Custom Cleaner (see FIG. 17), then calls the 'Clean' method in the engine at step 1602. The engine executes the custom instructions which may disinfect the machine by removing/cleaning/eliminating all infected files, directories, registry entries, processes, services, etc. The cleaning instructions can include calls to one or more tools at steps 1604 and 1610 if they were included in the Custom Cleaner archive (e.g., at step 1502). The tools can be batch files, registry import files, simple executable utilities, etc.

Additional Tools may also include repair utilities that address and/or fix specific problems created by the infection, such as a tool to repair a broken LSP chain. In some cases a custom executable may be created specifically for the cleaning of the infection, or repairing of the machine after the infection has been removed. If any of these Tools are included in a Custom Cleaner they would be invoked by instructions in the primary vCleaner script. Additional Tools provide an effective method for cleaning particularly difficult infections.

After executing all Custom Cleaner instructions, at step 1606 vCleaner reports the status of the procedure back to the Scanner application. The Scanner will then double-check that the infection was completely removed at step 1620 by calling vCleaner's 'Detect' method, which uses the 'Detect' instructions in the vCleaner Script file to verify that no infected objects remain on the user's machine. If at step 1620 no infected objects remain on the machine, at step 1624 the Scanner reports to the user that the Custom Cleaner succeeded and at step 1626 the process ends. If infected objects remain, at step 1630 the Scanner reports to the user that additional cleaning is needed, and prompts the user to generate a new Custom Cleaner Request (see step 206 at FIG. 4) or contact Technical Support.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of generating a potential solution for clearing a user computer of a malicious effect, comprising:

scanning objects of a user computer;

logging scan results in a first log file;

determining from said scan results presence of an object suspected of having a potentially malicious effect;

determining that the user computer is unable to clear the potentially malicious effect;

after said determining presence and said determining an inability to clear, logging information about the malicious effect in a second log file, the logged information including at least one of a known name of the malicious effect, a location of the malicious effect, a name of an object determined to be infected by the malicious effect, and a location of the object determined to be infected by the malicious effect;

after said determining presence and said determining an inability to clear, deriving a system snapshot of the user computer by scanning resources resident to the computer and storing resource scan results in a third log file, said snapshot comprising information for a plurality of file folders, information for a plurality of processes, information about a plurality of registry keys, and information about a plurality of system services;

after said determining presence and said determining an inability to clear, uploading a request to clean the user computer of the malicious effect, wherein the request comprises contents of the first log file, the second log file and the third log file;

downloading to the user computer a potential solution to the malicious effect, wherein the potential solution is based at least in part upon an automated analysis of the uploaded information; and implementing the potential solution at the user computer;

wherein said uploading is triggered and performed automatically without user intervention by a user of the user computer.

2. The method of claim 1, wherein said uploading, downloading and implementing are performed automatically without user intervention by an operator of the user computer.

3. The method of claim 1, wherein said resource scanning comprises scanning currently running processes, wherein attributes of said currently running processes that are unknown are stored in the third log file, and wherein attributes of said currently running processes that are infected with the malicious effect are stored in the third log file.

4. The method of claim 1, further comprising, non-resident to the user computer:

performing an automated analysis of the uploaded information;

accessing a parameterized database; and generating the potential solution without accessing the object suspected of having the potentially malicious effect, wherein the potential solution is based upon said automated analysis and comprises instructions from the database of parameterized instructions.

5. The method of claim 1, wherein the potential solution is derived without human intervention based at least in part upon said automated analysis of the uploaded information.

6. The method of claim 4, further comprising:
automatically requesting intervention of support personnel in deriving the potential solution in response to the automated analysis; and
automatically deriving technical hints during the automated analysis for use by the support personnel.

7. The clearing method of claim 1, wherein said downloading comprising downloading a customized process for implementing the potential solution to the malicious effect at the user computer.

8. The clearing method of claim 1, further comprising: automatically analyzing the uploaded information nonresident to the user computer to identify a potential solution to the malicious effect.

9. The clearing method of claim 1, wherein said resource scanning and results storing is performed automatically in response to said determining the inability to clear, and wherein said uploading is performed automatically following said-gathering.

10. The clearing method of claim 1, wherein said resource scanning and results storing is performed periodically.

11. The clearing method of claim 1, further comprising automatically verifying success of said solution in clearing the user computer of the malicious effect.

12. The method of claim 1, wherein the request omits the object suspected of having the potentially malicious effect.

13. A system of generating a potential solution for clearing a user computer of a, virus, comprising:
a first program executable by the computer that scans objects of a computer for viruses, stores scan results in a first log file, and determines that a detected virus is unable to be cleared from the computer;
second program executable by the computer for logging information about the detected virus in a second log file, the logged information including at least one of a known name of the detected virus, a location of the detected virus, a name of an object determined to be infected by the detected virus, and a location of the object determined to be infected by the detected virus; wherein the second program is executed after a determination that the detected virus cannot be cleared;
a third program executable by the computer for deriving a snapshot of system information pertaining to the computer, the snapshot comprising a log of attributes of folders, processes, registry keys and system services for all or a portion of the folders, processes, registry keys and system services resident to the computer, the attributes being stored in a third log file, wherein the third program is executed after a determination that the detected virus cannot be cleared;
a first communication device for uploading a request to clean the user computer of the malicious effect, wherein the request comprises said system snapshot;
a potential solution derived based at least in part upon an automated analysis of the uploaded system information, the first communication device downloading to the user computer said potential solution to the malicious effect; and
a processor for executing the potential solution at the user computer.

14. The system of claim 13, further comprising, non-resident to the user computer:

a remote computer having a processor which executes a program that performs an automated analysis of the uploaded information and that generates the potential solution at least in part by retrieving instructions from a parameterized database.

15. The system of claim 13, wherein the third log file comprises attributes of changed folders, processes, registry keys and system services.

16. The system of claim 13, wherein the third log file comprises registry key attributes from startup locations.

17. A process for creating a custom cleaner for clearing a source of a malicious effect from a computer, wherein all steps are performed in automated sequence without human intervention, comprising:
automatically detecting a need for the custom cleaner, wherein said detecting comprises identifying an object suspected of being a source of the malicious effect and determining an inability to clear the computer of the malicious effect;
logging information about the malicious effect in a second log file, the logged information including at least one of a known name of the malicious effect, a location of the malicious effect, a name of an object determined to be infected by the malicious effect, and a location of the object determined to be infected by the malicious effect;
automatically gathering specific system information pertaining to resources resident to the computer, the system information comprising a plurality of registry keys, file attributes of a plurality of files, and attributes for a plurality of processes, the specific system information being included in a third log file;
automatically generating and transmitting a custom cleaner request to a server for processing, the custom cleaner request comprising the second log file and the third log file;
automatically generating the custom cleaner from a database of parameterized instructions;
automatically downloading the custom cleaner to the computer; and
automatically executing the custom cleaner after being received at the computer.

18. The process of claim 17, wherein the custom cleaner request omits the object suspected of having the potentially malicious effect.

19. A method of generating a potential solution for clearing a user computer of a malicious effect suspected of being associated with an object on the user computer, comprising:
receiving at a server computer, a first log of a malicious effect scan results pertaining to the user computer, a second log of information about the malicious effect, and a third log of system resource scan results;
wherein the second log information includes at least one of a known name of the malicious effect, a location of the malicious effect, a name of an object determined to be infected by the malicious effect, and a location of the object determined to be infected by the malicious effect;
wherein the third log corresponds to a system snapshot comprising file attributes for a plurality of folders, attributes for a plurality of processes, registry keys, and attributes for a plurality of system services;
analyzing the received information nonresident to the user computer to identify a potential solution to the malicious effect, wherein the analysis is performed nonresident to the user computer without access to the object;
downloading to the user computer a potential solution to the malicious effect; and receiving from the user computer response information pertaining to carrying out said implementing of the potential solution.

20. The method of claim 19, wherein said analyzing comprises:
  identifying a potential source of the malicious effect;
  accessing a database to determine whether a procedure is available for addressing the potential source; and
  preparing the potential solution.

21. The method of claim 20, wherein said steps of identifying, accessing and preparing are performed automatically without human intervention.

22. The method of claim 19, wherein said analyzing comprises:
  identifying a potential source of the malicious effect;
  accessing a database to determine whether a procedure is available for addressing the potential source;
  determining that the procedure is not available for addressing said potential source; and
  generating an escalation request to notify a support technician of a need for human development of said instruction code.

23. The method of claim 22, further comprising preparing said procedure and adding said procedure to the database.

24. The method of claim 22, wherein said escalation request includes diagnostic hints.

25. The method of claim 19, wherein said analyzing comprises:
  executing an automatic process to analyze the uploaded data;
  determining that a potential source of the malicious effect is not identified by the automatic process; and
  generating an escalation request to notify a support technician of a need for human development of the potential solution.

26. The method of claim 19, wherein said receiving comprises receiving logged information pertaining to a suspicious attribute of an object of the user computer, wherein said server maintains a user account database, and further comprising:
  storing the logged information into the user database for a specific user account.

27. The method of claim 19, wherein said receiving excludes content of said object.

* * * * *